(12) United States Patent
Baccouche et al.

(10) Patent No.: US 12,441,261 B2
(45) Date of Patent: Oct. 14, 2025

(54) ENERGY ABSORBING STRUCTURE FOR VEHICLE

(71) Applicant: Ford Global Technologies, LLC, Dearborn, MI (US)

(72) Inventors: Mohamed Ridha Baccouche, Ann Arbor, MI (US); Jamal Bakkar, Canton, MI (US); Fubang Wu, Woodhaven, MI (US); Horst Heribert Lanzerath, Bad Muenstereifel (DE)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 17/851,767

(22) Filed: Jun. 28, 2022

(65) Prior Publication Data
US 2023/0415687 A1 Dec. 28, 2023

(51) Int. Cl.
*B60R 19/34* (2006.01)

(52) U.S. Cl.
CPC ................................ *B60R 19/34* (2013.01)

(58) Field of Classification Search
CPC ......... B60R 19/34; B60R 19/26; B60R 19/24; B60R 19/023; B60R 2019/264; B60R 2019/005; B62D 21/152; B62D 21/155; B62D 23/005; B62D 21/157; E01F 15/148
USPC ............ 293/133, 132, 122, 135; 296/187.03, 296/187.09, 203.02, 203.03, 205; 188/377
See application file for complete search history.

(56) References Cited

U.S. PATENT DOCUMENTS

| | | | | |
|---|---|---|---|---|
| 5,218,792 A | * | 6/1993 | Cooper | B62D 33/044 296/210 |
| 5,732,801 A | * | 3/1998 | Gertz | F16F 7/123 293/133 |
| 7,305,766 B1 | * | 12/2007 | Timmermans | B62D 47/02 296/193.07 |
| 7,469,513 B2 | * | 12/2008 | Schipani | E04C 3/005 52/646 |
| 9,533,642 B2 | | 1/2017 | Hundley et al. | |
| 9,725,057 B2 | | 8/2017 | Lee et al. | |
| 10,343,725 B2 | * | 7/2019 | Martin | B62D 29/041 |

(Continued)

FOREIGN PATENT DOCUMENTS

| | | |
|---|---|---|
| CN | 113027972 | 6/2021 |
| CN | 112356523 | 12/2021 |

(Continued)

OTHER PUBLICATIONS

Aoi et al. (JP 2015054544 A), machine translation (Year: 2015).*

*Primary Examiner* — Amy R Weisberg
*Assistant Examiner* — Wenwei Zhuo
(74) *Attorney, Agent, or Firm* — Burris Law, PLLC

(57) ABSTRACT

An energy absorbing structure connects a first structure of a vehicle to an adjacent second structure of the vehicle. The energy absorbing structure includes support beams and lattice arrays. Each support beam is located at a respective corner of the energy absorbing structure and extend in a longitudinal direction of the vehicle. The support beams connect the first structure to the second structure. The lattice arrays are located at respective sides of the energy absorbing structure and form a periphery of the energy absorbing structure. Each lattice array connects adjacent support beams to each other.

18 Claims, 11 Drawing Sheets

(56) References Cited

U.S. PATENT DOCUMENTS

| | | | |
|---|---|---|---|
| 10,960,468 B2* | 3/2021 | Czinger | B62D 27/026 |
| 2003/0088026 A1* | 5/2003 | Fujimoto | C08L 63/00 |
| | | | 525/107 |
| 2003/0215285 A1* | 11/2003 | Leonhardt | B60R 19/00 |
| | | | 404/6 |
| 2010/0287715 A1* | 11/2010 | Voyiadjis | E02B 3/26 |
| | | | 405/212 |
| 2011/0283873 A1* | 11/2011 | Wadley | B32B 3/12 |
| | | | 89/917 |
| 2013/0291476 A1* | 11/2013 | Broughton, Jr. | D02G 3/385 |
| | | | 29/897 |
| 2017/0096174 A1* | 4/2017 | Kariniemi | B62D 23/005 |
| 2017/0158246 A1* | 6/2017 | Kang | B62D 25/081 |
| 2017/0173894 A1* | 6/2017 | Konrad | B62D 29/043 |
| 2018/0258642 A1* | 9/2018 | Asay | E04C 3/28 |
| 2019/0111872 A1* | 4/2019 | Newcomb | B60R 19/18 |
| 2019/0291360 A1* | 9/2019 | Hogger | B29C 70/205 |
| 2020/0023584 A1 | 1/2020 | Portela et al. | |
| 2020/0023907 A1* | 1/2020 | Yoshida | B62D 25/081 |
| 2021/0114663 A1* | 4/2021 | Tyan | B21C 23/14 |
| 2021/0155180 A1* | 5/2021 | Faruque | B33Y 80/00 |

FOREIGN PATENT DOCUMENTS

| | | | | |
|---|---|---|---|---|
| CN | 117382566 A | * | 1/2024 | |
| JP | 2015054544 A | * | 3/2015 | |
| WO | WO-2004083526 A1 | * | 9/2004 | B60R 19/26 |
| WO | WO-2020139239 A1 | * | 7/2020 | B60R 19/34 |
| WO | WO-2022063884 A1 | * | 3/2022 | |

* cited by examiner

ENERGY ABSORBING STRUCTURE FOR VEHICLE

FIELD

The present disclosure relates to an energy absorbing structure for a vehicle and a vehicle including an energy absorbing structure.

BACKGROUND

The statements in this section merely provide background information related to the present disclosure and may not constitute prior art.

Typically, a vehicle includes a front bumper installed at a front side of the vehicle and a rear bumper installed at a rear side of the vehicle to reduce loads transferred to a body of the vehicle along with other components (e.g., an engine) during an impact event, a predominantly frontal or rear impact event. The vehicle further includes crush cans disposed between the front bumper and a main frame of the vehicle, and between the rear bumper and the main frame. The crush cans are configured to deform in an axial direction during such impacts, thereby absorbing energy of the impact event.

While typical vehicle energy absorbing structures such as crush cans work well for some applications, other applications may benefit from using energy absorbing structures that are lighter weight or are formed from different manufacturing processes. The teachings of the present disclosure address these and other issues with typical vehicle energy absorbing structures.

SUMMARY

This section provides a general summary of the disclosure and is not a comprehensive disclosure of its full scope or all of its features.

In one form, the present disclosure discloses an energy absorbing structure that connects a first structure of a vehicle to an adjacent second structure of the vehicle. The energy absorbing structure includes support beams and lattice arrays. Each support beam is located at a respective corner of the energy absorbing structure and extend in a longitudinal direction of the vehicle. The support beams connect the first structure to the second structure. The lattice arrays are located at respective sides of the energy absorbing structure and form a periphery of the energy absorbing structure. Each lattice array connects adjacent support beams to each other.

In variations of the energy absorbing structure of the above paragraph, which can be implemented individually or in combination: each support beam of the plurality of support beams has a variable cross-section; each support beam of the plurality of support beams is hollow; each support beam of the plurality of support beams has a variable thickness; each support beam of the plurality of support beams has a constant cross-section; each support beam of the plurality of support beams has a square cross-sectional shape; the energy absorbing structure does not include any lattice arrays that span between non-adjacent support beams of the plurality of support beams; at least one lattice array of the plurality of lattice arrays includes a plurality of solid lattice beams, each solid lattice beam of the plurality of solid lattice beams has a variable cross-section; each solid lattice beam has a rectangular cross-sectional shape; and the plurality of support beams and the plurality of lattice arrays are made of aluminum.

In another form, the present disclosure discloses an energy absorbing assembly including a first structure, a second structure and a plurality of energy absorbing structures. The second structure is spaced apart from the first structure and extends in a transverse direction of the vehicle. The energy absorbing structures connect the first structure to the second structure. Each energy absorbing structure includes support beams and lattice arrays. Each support beam is located at a respective corner of the energy absorbing structure and extends in a longitudinal direction of the vehicle. The lattice arrays are located at respective sides of the energy absorbing structure and form a periphery of the energy absorbing structure. Each lattice array connects adjacent support beams to each other.

In variations of the energy absorbing structure of the above paragraph, which can be implemented individually or in combination: each energy absorbing structure includes a first end adjacent to the second structure and a second end adjacent to the first structure, each energy absorbing structure is tapered from the first end toward the second end; each energy absorbing structure extends at an angle relative to a horizontal axis extending parallel to the longitudinal direction of the vehicle; and the angle is between 1 degree and 20 degrees.

In yet another form, the present disclosure discloses an energy absorbing assembly including a first structure, a second structure and a plurality of energy absorbing structures. The second structure is spaced apart from the first structure and extends in a transverse direction of the vehicle. The energy absorbing structures connect the first structure to the second structure. Each energy absorbing structure includes hollow support beams and lattice arrays. Each support beam is located at a respective corner of the energy absorbing structure and extends in a longitudinal direction of the vehicle. The lattice arrays are located at respective sides of the energy absorbing structure and form a periphery of the energy absorbing structure. Each lattice array connects adjacent support beams to each other. At least one lattice array of the plurality of lattice arrays includes a plurality of solid lattice beams. Each solid lattice beam of the plurality of solid lattice beams has a variable cross-section.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
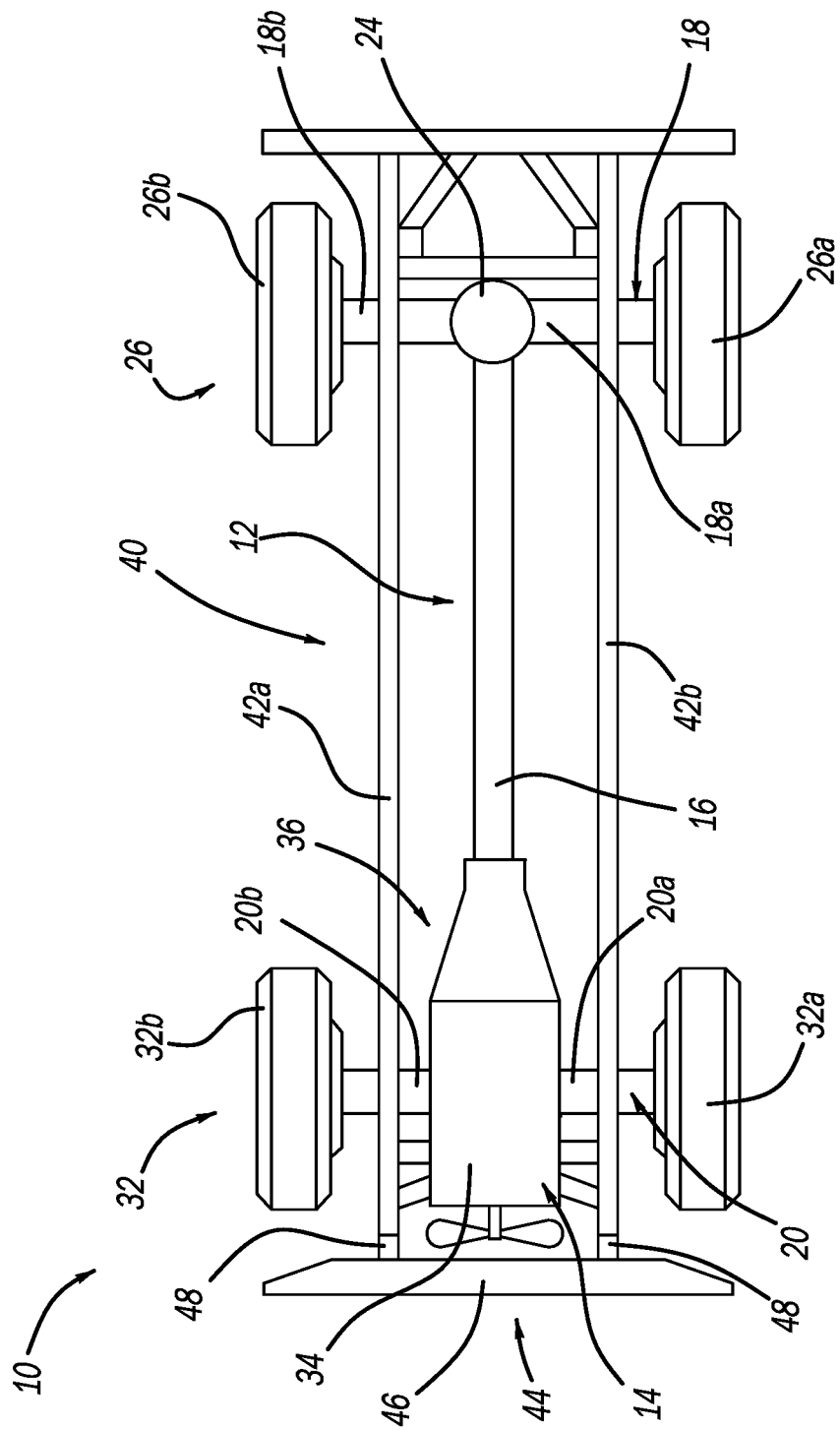
FIG. 1 is a schematic view of a vehicle including energy absorbing structures according to the principles of the present disclosure.
Figure 2:
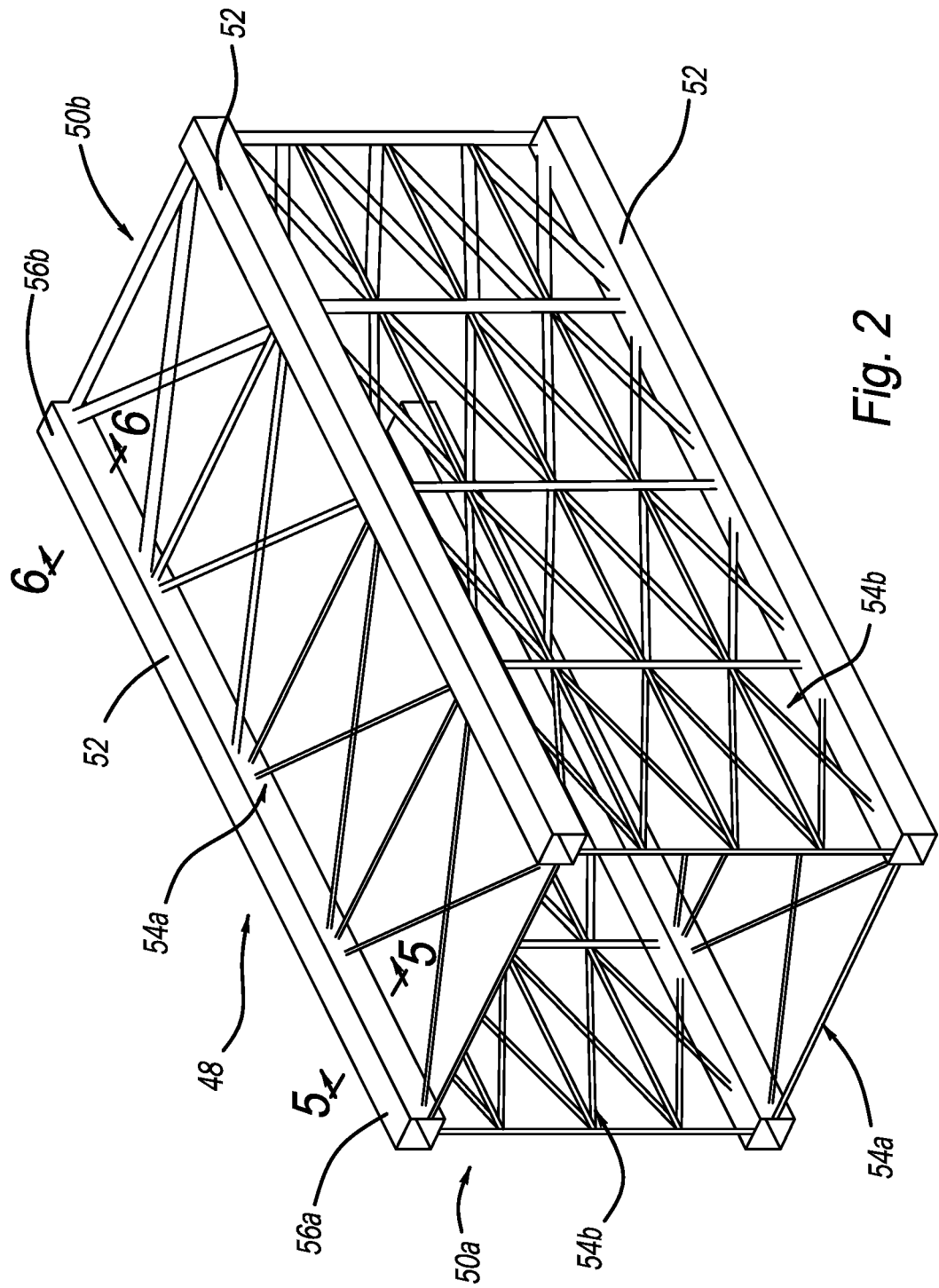
FIG. 2 is a perspective view of one energy absorbing structure of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is provided that includes a drivetrain system 12 and a powertrain system 14. In the particular configuration shown in FIG. 1, the drivetrain system 12 includes, inter alia, a propeller shaft 16, a primary axle 18, a secondary axle 20, and a rear differential 24. Rotary power (vehicle torque) generated by the powertrain system 14 is transmitted to the drivetrain system 12. That is, rotary power generated by the powertrain system 14 is transmitted to the primary axle 18 via the propeller shaft 16 to drive a set of rear wheels 26. The primary axle 18 includes a first shaft 18a and a second shaft 18b. The first shaft 18a drives a first wheel 26a of the set of rear wheels 26 and the second shaft 18b drives a second wheel 26b of the set of rear wheels 26. The secondary axle 20 includes a first shaft 20a and a second shaft 20b. The first shaft 20a is connected to a first wheel 32a of a set of front wheels 32 and the second shaft 20b is connected to a second wheel 32b of the set of front wheels 32. The powertrain system 14 includes an engine 34 and a transmission 36. The engine 34 generates rotary power and may be an internal combustion engine, for example. The transmission 36 transmits rotary power from the engine 34 to the drivetrain system 12. In an alternative configuration, not specifically shown, the vehicle 10 may be a different type of vehicle, including but not limited to a front-wheel drive, all-wheel drive, or four-wheel drive vehicle. In an alternative configuration, not specifically shown, the vehicle 10 may have a different type of drivetrain system 12 and powertrain system 14, including but not limited to electric power, hybrid-electric power, or fuel cells for example.

The vehicle 10 further includes a vehicle frame 40, which acts as the main support structure of the vehicle 10 to which various components are attached either directly or indirectly. The vehicle frame 40 includes opposed longitudinal rails 42a, 42b and a front-end assembly 44. The rails 42a, 42b are spaced apart from each other. Cross members extend in a transverse direction relative to a longitudinal direction of the vehicle 10 and connect the longitudinal rails 42a, 42b to each other. While the vehicle 10 is illustrated and described herein as a body on frame vehicle, in an alternative form, not specifically shown, the front-end assembly 44 described herein may be used with a different type of vehicle architecture, e.g., unibody frame, monocoque frame, or space frame.

The front-end assembly 44 includes, inter alia, a bumper structure 46 and a pair of energy absorbing structures or crush cans 48. The bumper structure 46 extends in a transverse direction relative to the longitudinal direction of the vehicle 10 and is secured to the vehicle frame 40 via the pair of energy absorbing structures 48.

Figure 8:
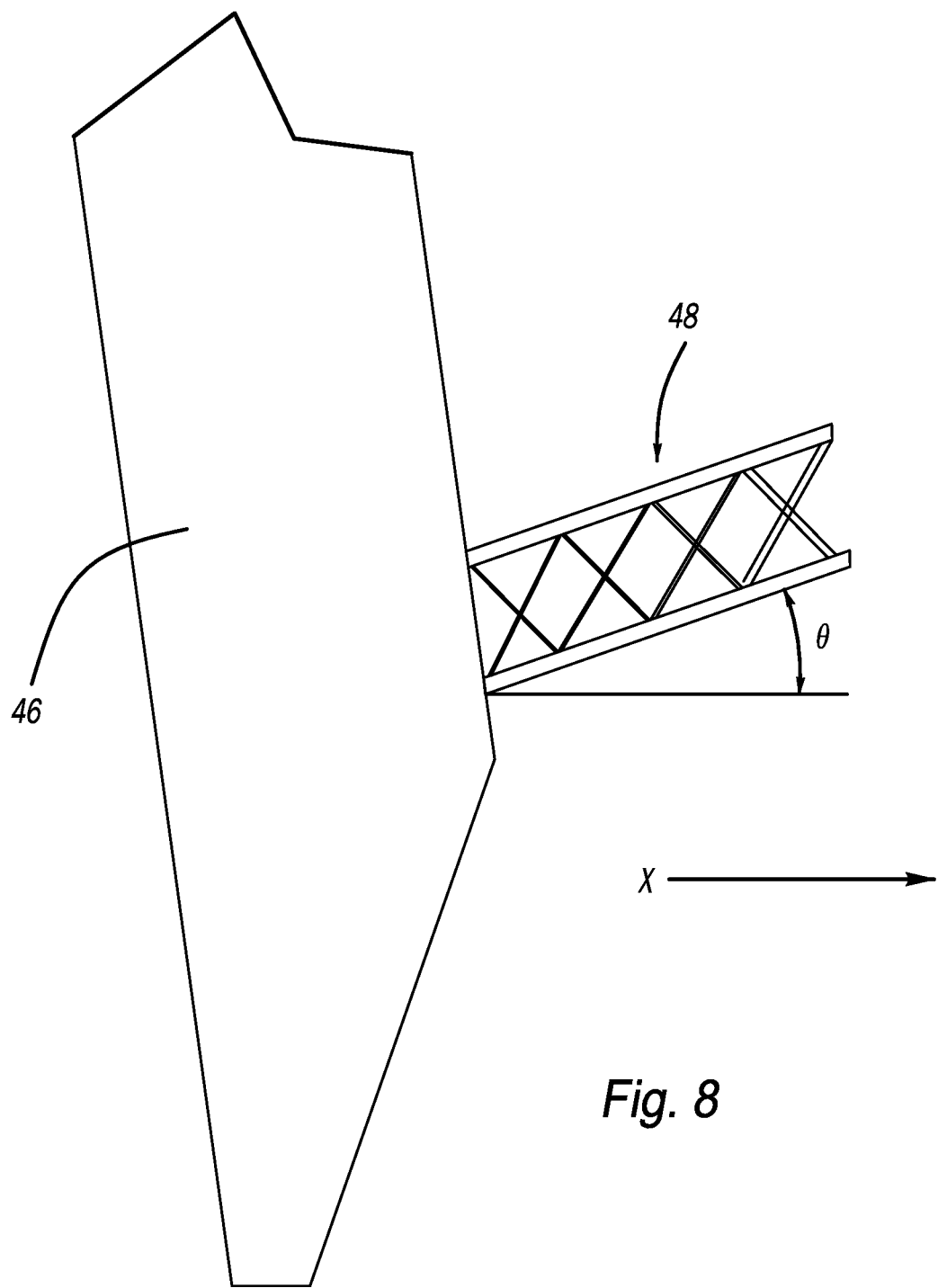
FIG. 8 is a side view of an energy absorbing structure inclined according to the principles of the present disclosure.

With reference to FIGS. 2-6, the energy absorbing structures 48 have a shape such as a square or rectangular shape that facilitates controlled crushing or deforming to dissipate crash energy under predetermined loads in the longitudinal direction of the vehicle 10. In the example illustrated, the energy absorbing structures 48 extend in the longitudinal direction of the vehicle 10. In some forms, as shown in FIG. 8, the energy absorbing structure 48a extends at an angle θ relative to a horizontal axis X extending parallel to the longitudinal direction of the vehicle 10. The angle θ is between 1 degree and 20 degrees.

Referring back to FIGS. 2-6, each energy absorbing structure 48 includes a first end 50a fixed to the bumper structure 46 (FIG. 1) and a second end 50b fixed to a front end of a respective rail 42a, 42b (FIG. 1), thereby forming a vehicle body structure or an energy absorbing assembly. In some forms, the first end 50a is fixed to the bumper structure 46 (FIG. 1) by a plate or bracket member (not shown) and the second end 50b is fixed to the front end of the respective rail 42a, 42b (FIG. 1) by a plate or bracket member (not shown). Each energy absorbing structure 48 also has a uniform or constant cross-section from the first end 50a to the second end 50b.

Each energy absorbing structure 48 is in the form of a single unitized, monolithic body that can be manufactured by an additive manufacturing process. The manufacturing process can include laser sintering, for example, that can generally include a laser (not shown), a device (not shown) for applying subsequent layers of powdered sintering material (e.g., metal powder), and a controller (not shown) that controls operation of the laser and the amount and timing of the deposition of the metal powder. It should be understood that other 3D printing or additive manufacturing methods may be employed to achieve the unitized, monolithic body, along with a variety of different materials, while remaining within the scope of the present disclosure.

Each energy absorbing structure 48 includes a plurality of hollow support beams 52 and a plurality of lattice arrays (including lattice arrays 54a and lattice arrays 54b). The support beams 52 are spaced apart from each other and located at respective corners of the energy absorbing structure 48. The support beams 52 also extend in a longitudinal direction of the vehicle 10 and have a square shape. In some forms, the shape of the support beams 52 may be rectangular, cylindrical or any other suitable shape. In some forms, one or more support beams 52 may be solid instead of hollow.

The support beams 52 connect the bumper structure 46 (FIG. 1) to the front end of the respective rail 42a, 42b (FIG. 1). Stated differently, the support beams 52 have a first end 56a connected to the bumper structure 46 (FIG. 1) and a second end 56b connected to the respective rail 42a, 42b (FIG. 1).

In the example illustrated, the support beams 52 have a variable cross-section from the first end 56a to the second end 56b. In some forms, the support beams 52 have a uniform cross-section from the first end 56a to the second end 56b.

In the example illustrated, the support beams 52 have a variable thickness from the first end 56a to the second end 56b. That is, a portion of the support beams 52 closest to the second end 56b (or the respective rail 42a, 42b) has a thickness that is greater than a portion of the support beams 52 closest to the first end 56a (or the bumper structure 46). In this way, crushing of the energy absorbing structure 48 in the longitudinal direction from the first end 56a to the second end 56b under a predetermined load is facilitated. In some forms, the support beams 52 have a uniform thickness from the first end 56a to the second end 56b.

In one form, the material of the support beams 52 is constant along the entire length of the support beams 52. In some alternative forms, the material of the support beams 52 may be variable along the length of the support beams 52. That is, a portion of the support beams 52 located near the rails 42a, 42b may be made of steel, for example, while a portion of the support beams 52 located near the bumper structure 46 is made of aluminum, for example. In another form, some of the support beams 52 may be one material while others of the support beams 52 may be a different material.

The lattice arrays 54a, 54b form a periphery of the energy absorbing structure 48 and connect adjacent support beams 52 to each other. The lattice arrays 54a, 54b also cooperate with the support beams 52 to surround a central or middle area of the energy absorbing structure 48. In the example illustrated, the central area is unoccupied. In some forms, the central area is occupied with one or more lattice arrays.

Each lattice array 54a includes a plurality of beams or struts (i.e., beams 62a, 62b, collectively or generally referred to herein as beams 62) oriented in a predetermined configuration and each lattice array 54b includes a plurality of beams or struts (i.e., beams 70a, 70b, 70c, collectively or generally referred to herein as beams 70) oriented in a predetermined configuration. In the example illustrated, the beams 62, 70 are solid and a have a rectangular shape. In some forms, the beams 62, 70 are hollow and/or have a different shape (e.g., cylindrical or square shape).

Figure 7A:
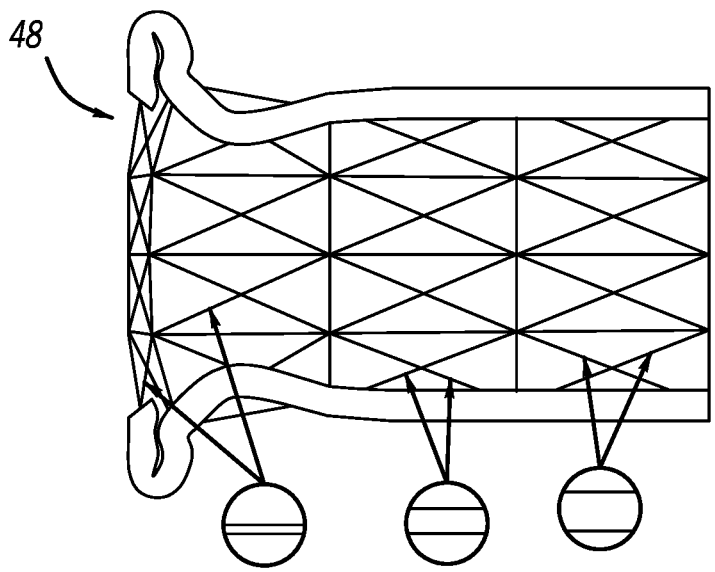
FIGS. 7a-7c are side views of the energy absorbing structure of FIG. 1 during different stages of an example impact event.
Figure 7B:
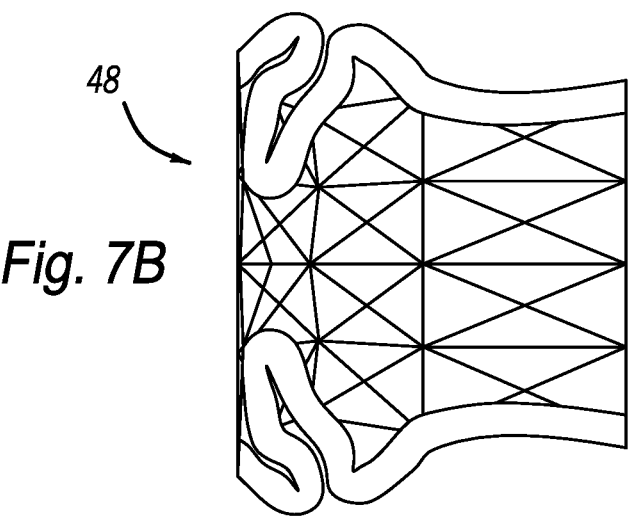
Figure 7C:
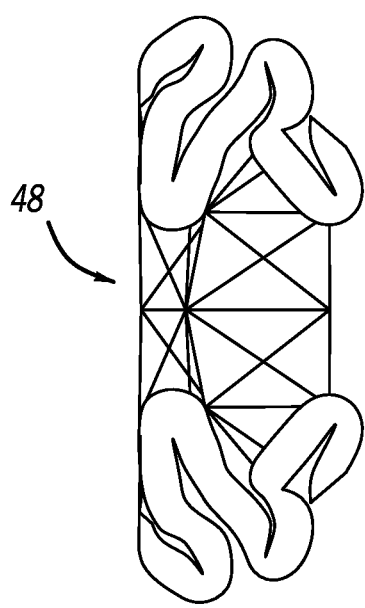

In the example illustrated, the beams 62, 70 have a variable cross-section. That is, a portion of the beams 62, 70 located near the rails 42a, 42b may have a greater cross-sectional area than a portion of the beams 62, 70 located near the bumper structure 46. In this way, crushing of the energy absorbing structure 48 in the longitudinal direction from the first end 50a of the energy absorbing structure 48 to the second end of the energy absorbing structure 48 under a predetermined load is facilitated. That is, as shown in FIGS. 7a-7c, the energy absorbing structure 48 deforms in the longitudinal direction from the first end 50a toward the second end 50b under a predetermined load. In some forms, the beams 62, 70 have a uniform cross-section.

In one form, the material of the beams 62, 70 is uniform along the entire length of the beams 62, 70. In another form, the material of the beams 62, 70 may be variable along the length of the beams 62, 70. That is, a portion of the beams 62, 70 located near the rails 42a, 42b may be made of steel, for example, while a portion of the beams 62, 70 located near the bumper structure 46 is made of aluminum, for example. In another form, some of the beams 62, 70 may be one material while others of the beams 62, 70 may be a different material.

Figure 3:
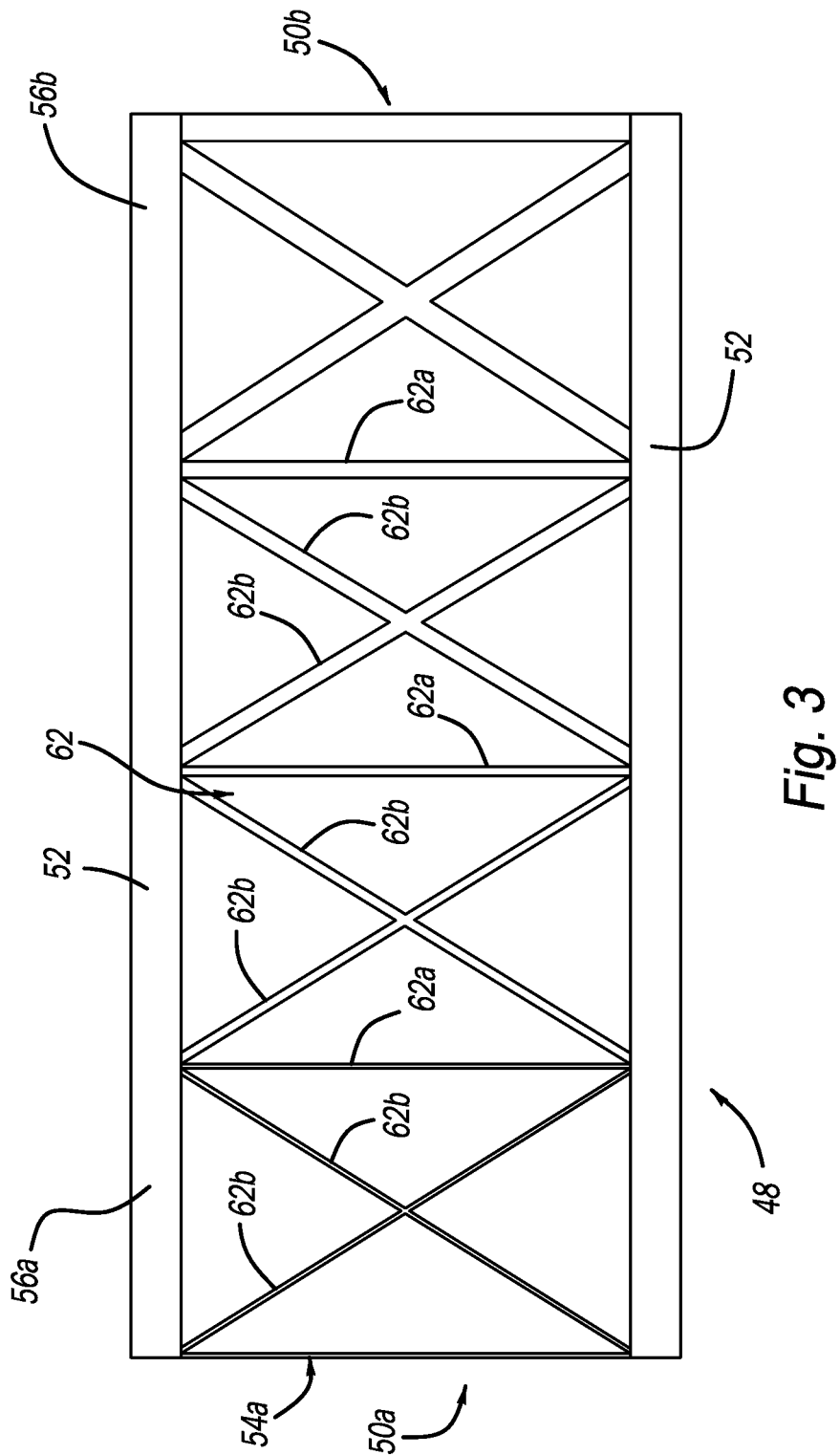
FIG. 3 is a top view of the energy absorbing structure of FIG. 1.

In the example illustrated, one lattice array 54a is located at an upper portion of the energy absorbing structure 48 and connects the two upper support beams 52 to each other, and one lattice array 54a is located at a lower portion of the energy absorbing structure 48 and connects the two lower support beams 52 to each other. Stated differently, one lattice array 54a acts as an upper portion of the energy absorbing structure 48 and one lattice array 54a acts as a bottom portion of the energy absorbing structure 48. With reference to FIG. 3, the beams 62a extend in a transverse direction of the vehicle 10 and the beams 62b extend in an oblique direction of the vehicle 10. Each beam 62b extends from one support beam 52 at a location closer to the bumper structure 46 to an adjacent support beam 52 at a location closer to the rail 42a, 42b. Two beams 62b are joined to each other at a central portion of the beams 62b.

Figure 4:
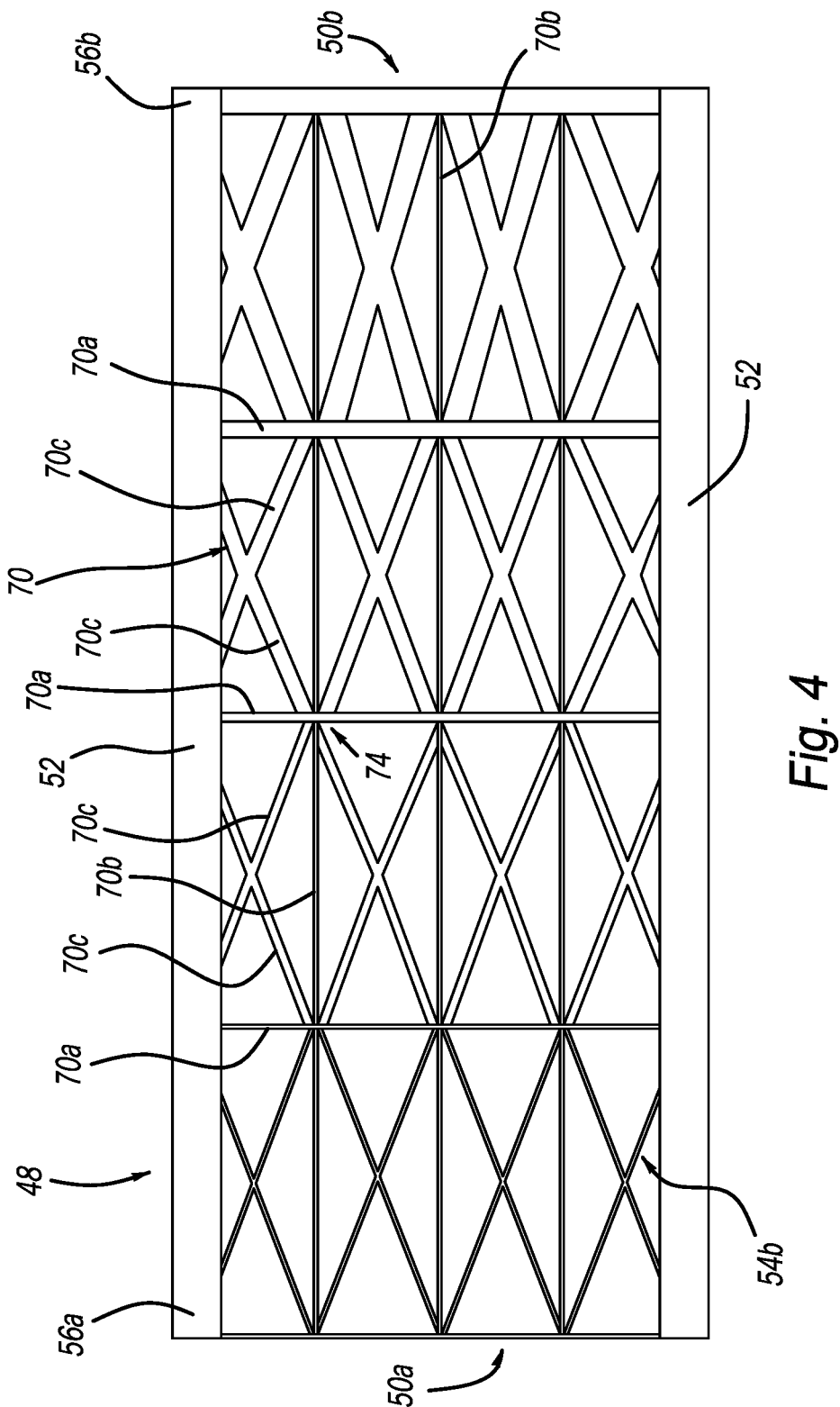
FIG. 4 is a side view of the energy absorbing structure of FIG. 1.
Figure 5:
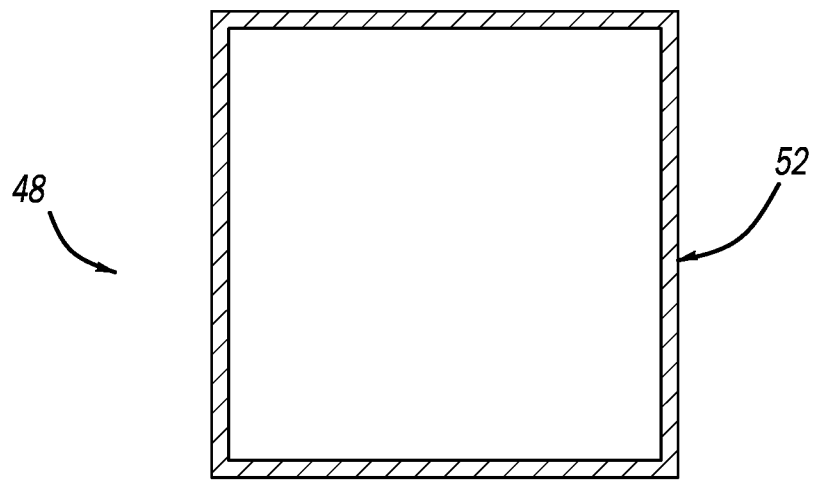
FIG. 5 is a cross-sectional view of the energy absorbing structure along line 5-5 of FIG. 2.
Figure 6:
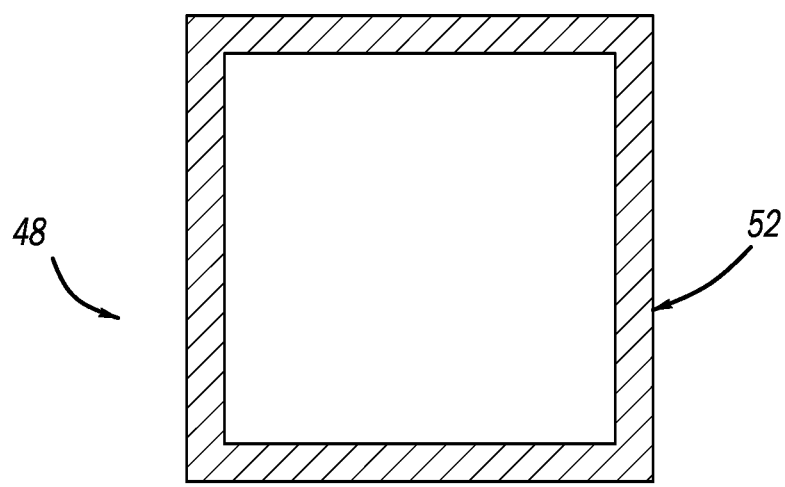
FIG. 6 is a cross-sectional view of the energy absorbing structure along line 6-6 of FIG. 2.

In the example illustrated, one lattice array 54b is located at a right side of the energy absorbing structure 48 and connects two adjacent support beams 52 to each other, and one lattice array 54b is located at a left side of the energy absorbing structure 48 and connects two adjacent support beams 52 to each other. With reference to FIG. 4, the beams 70a extend in a vertical direction, the beams 70b extend in a longitudinal direction of the vehicle 10, and the beams 70c extend in an oblique direction of the vehicle 10. Each beam 70c extends from one support beam 52 at a location closer to the bumper structure 46 toward an adjacent support beam 52 at a location closer to the rail 42a, 42b. The energy absorbing structure 48 includes a junction 74 joining the beams 70a, 70b, 70c. Two beams 70c are also joined to each other near or at a central portion of the beams 70c.

The energy absorbing structure 48 of the present disclosure being additively manufactured provides the benefit of allowing the beams to be variable in shape, thickness, material and/or cross-section. The energy absorbing structure 48 of the present disclosure being additively manufactured to include lattice arrays also reduces the weight of the energy absorbing structure 48 by using less material compared to conventional crush cans. In this way, the energy absorbing structure 48 includes less stack-up (i.e., the portion of the energy absorbing structure 48 that does not crush under the predetermined load), which allows more energy to be absorbed over the same distance than a typical crush can. Although the present disclosure provides energy absorbing structures disposed between a front bumper structure and the vehicle main frame, the energy absorbing structures may also be positioned at other locations of the vehicle to absorbing energy during a load, such as between a rear bumper structure and the vehicle main frame.

Figure 9:
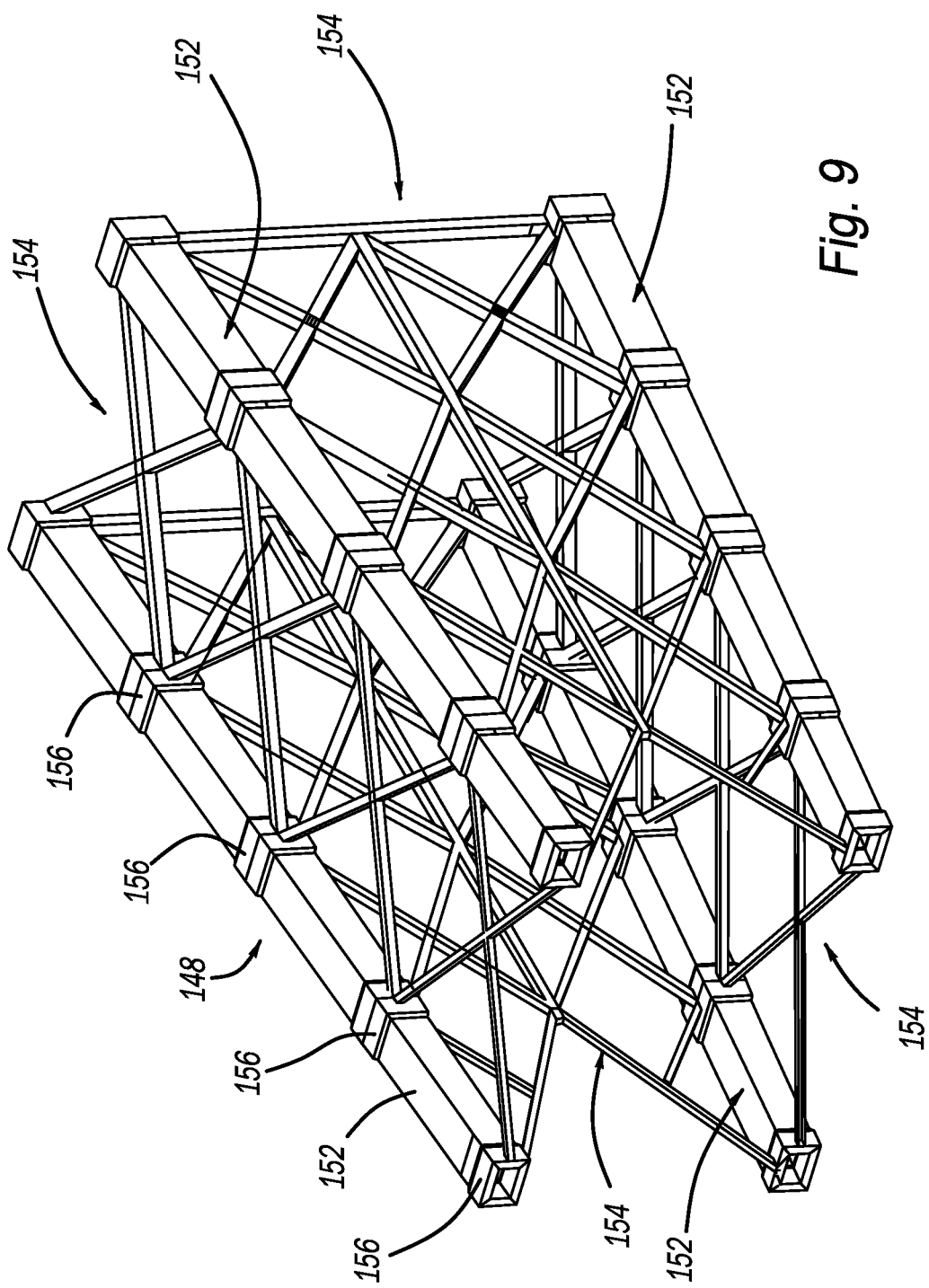
FIG. 9 is a perspective view of yet another energy absorbing structure according to the principles of the present disclosure.
Figure 10:
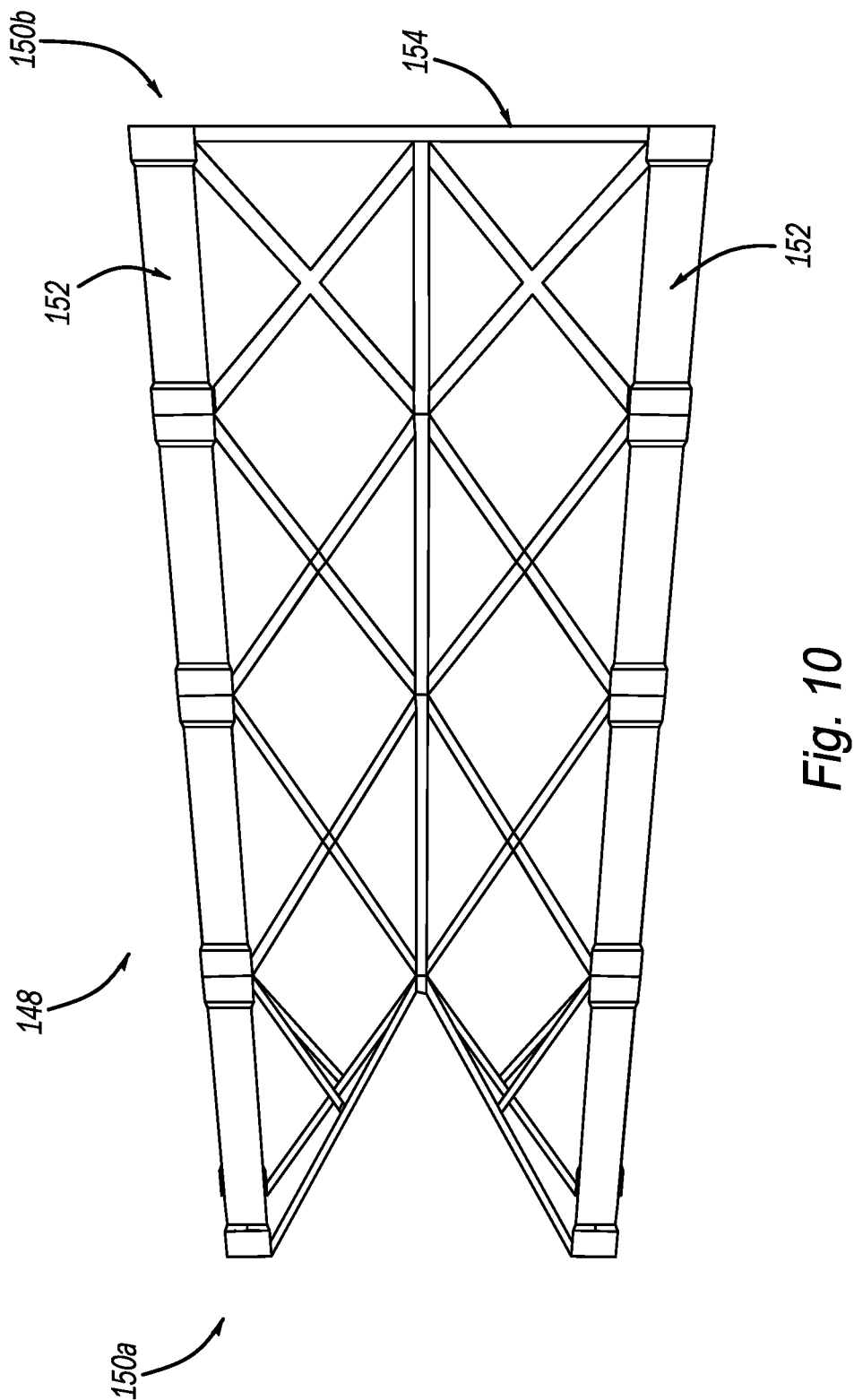
FIG. 10 is a side view of the energy absorbing structure of FIG. 9.

With reference to FIGS. 9 and 10, another energy absorbing structure 148 is provided. The energy absorbing structure 148 may be incorporated into vehicle 10 above instead of the energy absorbing structure 48. The structure and function of the energy absorbing structure 148 may be similar or identical to that of energy absorbing structure 48 described above, apart from any exceptions shown or noted below.

The energy absorbing structure 148 includes a plurality of hollow support beams 152 and a plurality of lattice arrays 154. The structure of and function of the support beams 152 and the lattice arrays 154 may be similar or identical to that of support beams 52 and lattice arrays 54, respectively, described above, and therefore, will not be described again in detail. The support beams 152 may include reinforcement structures 156 in locations where the lattice arrays 154 are connected to the support beams 152. The reinforcement structures 156 are located at areas of the support beams 152 where the lattice arrays 154 connect to the support beams 152 and include a thickness that is greater than a thickness of the support beams 152. The energy absorbing structure 148 includes a first end 150a configured to be fixed to the bumper structure 46 and a second end 150b configured to be fixed to a front end of a respective rail 42a, 42b (FIG. 1). The energy absorbing structure 148 is tapered from the first end 150a toward the second end 150b. Stated differently, the second end 150b has a cross-sectional area that is greater than that of the first end 150a. In other words, the support beams 152 are closer together at the first end 150a than the second end 150b.

Figure 11:
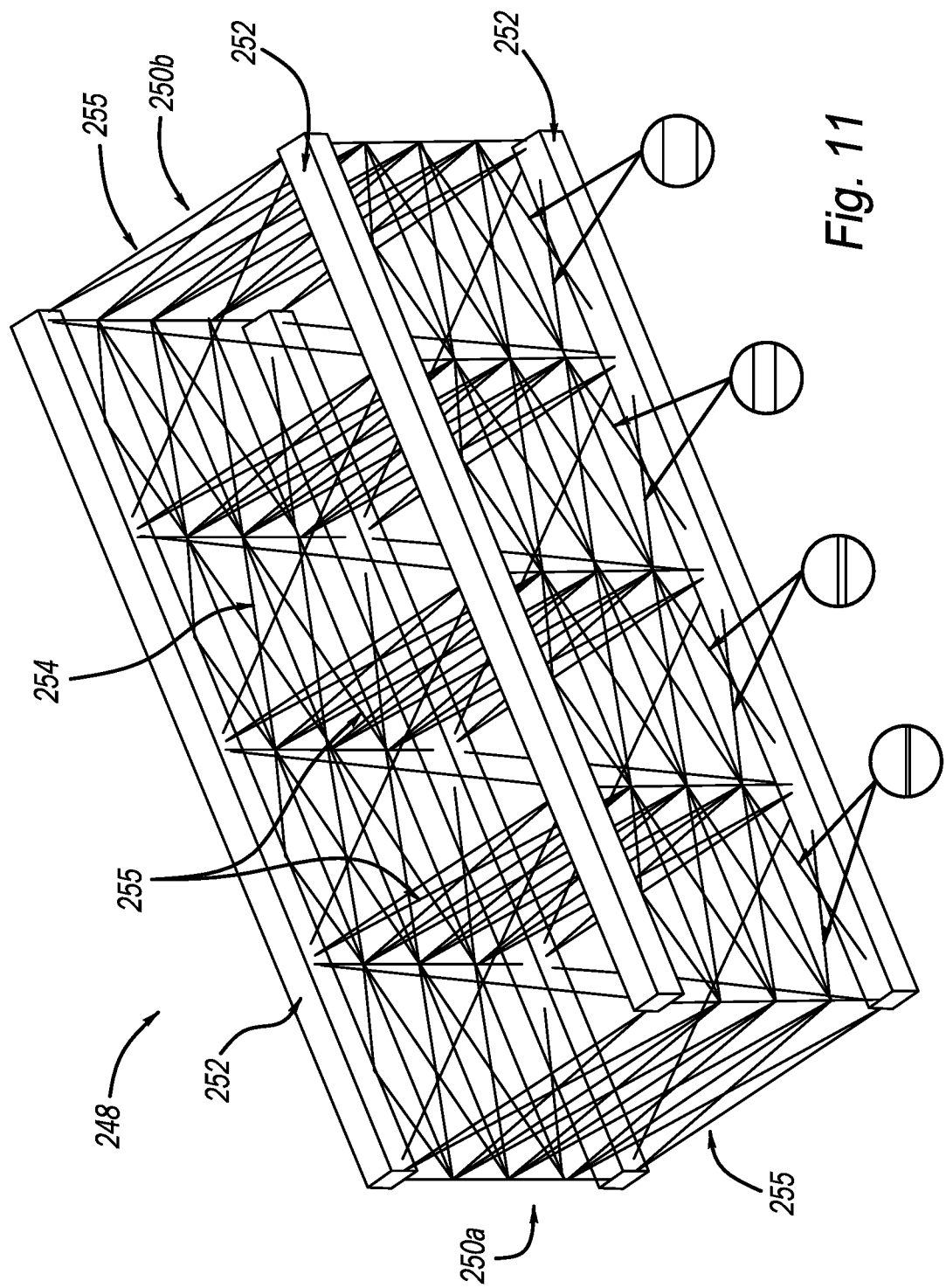
FIG. 11 is a perspective view of yet another energy absorbing structure according to the principles of the present disclosure.
Figure 12:
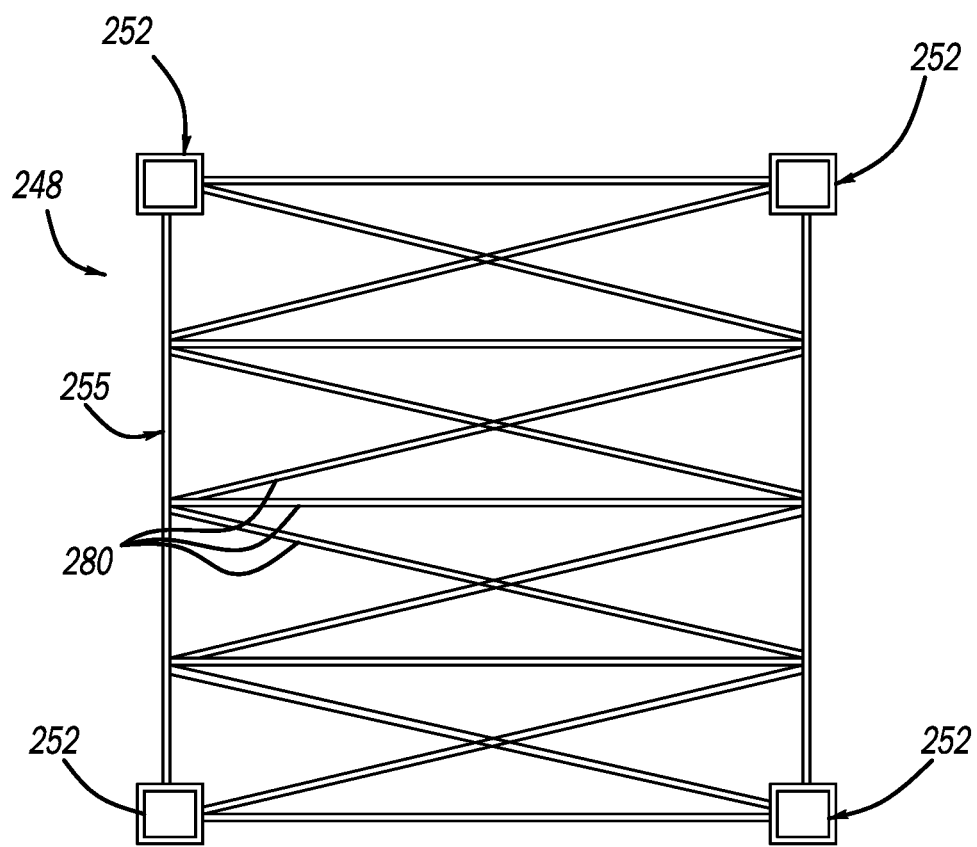
FIG. 12 is a front view of the energy absorbing structure of FIG. 11.

With reference to FIGS. 11 and 12, another energy absorbing structure 248 is provided. The energy absorbing structure 248 may be incorporated into vehicle 10 above instead of the energy absorbing structures 48, 148. The structure and function of the energy absorbing structure 248 may be similar or identical to that of energy absorbing structures 48, 148 described above, apart from any exceptions shown or noted below.

The energy absorbing structure 248 includes a first end 250a configured to be fixed to the bumper structure 46 and a second end 250b configured to be fixed to a front end of a respective rail 42a, 42b (FIG. 1). The energy absorbing structure 248 also includes a plurality of hollow support beams 252, a plurality of first lattice arrays 254 and a plurality of second lattice arrays 255. The structure of and function of the support beams 252 may be similar or identical to that of support beams 52 described above, and therefore, will not be described again in detail.

The lattice arrays 254 form a periphery of the energy absorbing structure 248 and connect adjacent support beams 252 to each other. The lattice arrays 254 also cooperate with the support beams 252 to surround a central or middle area of the energy absorbing structure 248. The structure and function of lattice arrays 254 may be similar or identical to that of lattice arrays 54a, 54b, described above, and therefore, will not be described again in detail.

The lattice arrays 255 are disposed at the central area of the energy absorbing structure 248 and are spaced apart from each other along the longitudinal direction of the vehicle 10. Each lattice array 255 includes a plurality of beams or struts 280 oriented in a predetermined configuration.

In the example illustrated, the beams 280 are solid and a have a rectangular shape. In some forms, the beams 280 are hollow and/or have a different shape (e.g., cylindrical or square shape).

In the example illustrated, the beams 280 have a variable cross-section. That is, a portion of the beams 280 located near one side of the energy absorbing structure 248 may have a greater cross-sectional area than a portion of the beams 280 located near an opposing side of the energy absorbing structure 248. In some forms, the beams 280 have a uniform cross-sectional area.

In one form, the material of the beams 280 is constant along the entire length of the beams 280. In another form, the material of the beams 280 may be variable along the length of the beams 280. That is, a portion of the beams 280 located near one side of the energy absorbing structure 248 may be made of steel, for example, while a portion of the beams 280 located near the opposing side of the energy absorbing structure 248 is made of aluminum, for example. In another form, some of the beams 280 may be one material while others of the beams 280 may be a different material.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An energy absorbing structure connecting a first structure of a vehicle to an adjacent second structure of the vehicle, the energy absorbing structure comprising:
    a plurality of support beams, each support beam being located at a respective corner of the energy absorbing structure and extending in a longitudinal direction of the vehicle, the plurality of support beams connecting the first structure to the second structure; and
    a plurality of lattice arrays located at respective lateral sides of the energy absorbing structure facing in different directions so as to form a periphery of the energy absorbing structure, each lattice array of the plurality of lattice arrays connecting adjacent support beams to each other,
    wherein the support beams and the lattice arrays surround a central area of the energy absorbing structure, the central area is unoccupied, and
    wherein each support beam of the plurality of support beams is hollow.

2. The energy absorbing structure of claim 1, wherein each support beam of the plurality of support beams has a variable cross-section.

3. The energy absorbing structure of claim 1, wherein each support beam of the plurality of support beams has a variable thickness.

4. The energy absorbing structure of claim 1, wherein each support beam of the plurality of support beams has a constant cross-section.

5. The energy absorbing structure of claim 1, wherein each support beam of the plurality of support beams has a square cross-sectional shape.

6. The energy absorbing structure of claim 1, wherein the energy absorbing structure does not include any lattice arrays that span between non-adjacent support beams of the plurality of support beams.

7. The energy absorbing structure of claim 1, wherein at least one lattice array of the plurality of lattice arrays comprises a plurality of solid lattice beams, and wherein each solid lattice beam of the plurality of solid lattice beams has a variable cross-section.

8. The energy absorbing structure of claim 7, wherein each solid lattice beam has a rectangular cross-sectional shape.

9. The energy absorbing structure of claim 1, wherein the plurality of support beams and the plurality of lattice arrays are made of aluminum.

10. An energy absorbing assembly for a vehicle, the energy absorbing assembly comprising:
    a first structure;
    a second structure spaced apart from the first structure and extending in a transverse direction of the vehicle; and
    a plurality of energy absorbing structures connecting the first structure to the second structure, each energy absorbing structure comprising:

a plurality of support beams located at respective corners of the energy absorbing structure and extending in a longitudinal direction of the vehicle; and a plurality of lattice arrays located at respective sides of the energy absorbing structure and forming a periphery of the energy absorbing structure, each lattice array of the plurality of lattice arrays connecting adjacent support beams to each other, wherein the plurality of lattice arrays extend from a first end of the plurality of support beams proximate the first structure to a second opposing end of the plurality of support beams proximate the second structure, wherein each support beam of the plurality of support beams is hollow.

11. The energy absorbing assembly of claim 10, wherein each energy absorbing structure includes a first end adjacent to the second structure and a second end adjacent to the first structure, and wherein each energy absorbing structure is tapered from the first end toward the second end.

12. The energy absorbing assembly of claim 10, wherein each energy absorbing structure extends at an angle relative to a horizontal axis extending parallel to the longitudinal direction of the vehicle.

13. The energy absorbing assembly of claim 12, wherein the angle is between 1 degree and 20 degrees.

14. The energy absorbing assembly of claim 10, wherein each support beam of the plurality of support beams has a variable thickness.

15. The energy absorbing assembly of claim 10, wherein each support beam of the plurality of support beams has a variable cross-section.

16. The energy absorbing assembly of claim 10, wherein at least one lattice array of the plurality of lattice arrays comprises a plurality of solid lattice beams, and wherein each solid lattice beam of the plurality of solid lattice beams has a variable cross-section.

17. The energy absorbing assembly of claim 16, wherein each solid lattice beam has a rectangular shape.

18. An energy absorbing assembly for a vehicle, the energy absorbing assembly comprising:

a vehicle frame;

a bumper spaced apart from the vehicle frame and extending in a transverse direction of the vehicle; and a plurality of energy absorbing structures disposed between and connecting the vehicle frame and the bumper, each energy absorbing structure comprising:

a plurality of hollow support beams located at respective corners of the energy absorbing structure and extending in a longitudinal direction of the vehicle; and a plurality of lattice arrays located at respective sides of the energy absorbing structure and forming a periphery of the energy absorbing structure, each lattice array of the plurality of lattice arrays connecting adjacent support beams to each other, wherein at least one lattice array of the plurality of lattice arrays comprises a plurality of solid lattice beams, and wherein each solid lattice beam of the plurality of solid lattice beams has a variable cross-section.

\* \* \* \* \*